United States Patent [19]
Tisack et al.

[11] Patent Number: 5,853,649
[45] Date of Patent: Dec. 29, 1998

[54] METHOD FOR MANUFACTURING A FOAM PANEL

[75] Inventors: Michael Derek Tisack, Ann Arbor; Kenneth Andrew Winowiecki, Waterford, both of Mich.

[73] Assignee: Ford Global Technologies, Inc., Dearborn, Mich.

[21] Appl. No.: 909,255

[22] Filed: Aug. 11, 1997

[51] Int. Cl.[6] .......................... B29C 44/06; B29C 44/12; B29C 44/14

[52] U.S. Cl. .................... 264/446; 264/46.4; 264/46.5; 264/46.8; 264/82; 264/83; 264/101; 264/405

[58] Field of Search .................. 264/46.4, 46.5, 264/405, 446, 82, 83, 101, 46.8

[56] References Cited

U.S. PATENT DOCUMENTS

| | | | |
|---|---|---|---|
| 4,457,729 | 7/1984 | Peerlkamp | 264/45.7 |
| 4,581,291 | 4/1986 | Bongianni . | |
| 4,704,153 | 11/1987 | Schwenninger et al. . | |
| 4,820,580 | 4/1989 | Hocker et al. . | |
| 5,098,618 | 3/1992 | Zelez | 264/446 |
| 5,098,750 | 3/1992 | Ueno et al. . | |
| 5,227,180 | 7/1993 | Tisack et al. | 425/174 |
| 5,236,636 | 8/1993 | Tisack | 264/83 |
| 5,560,963 | 10/1996 | Tisack | 427/489 |
| 5,603,874 | 2/1997 | Ishii et al. | 264/46.6 |

Primary Examiner—Allan R. Kuhns
Attorney, Agent, or Firm—Damian Porcari

[57] ABSTRACT

A method of manufacturing a panel having a foam interlayer. A flexible cover is placed adjacent a first mold in an open tool. A rigid substrate is placed adjacent a second mold, or alternately, is place atop the flexible cover in the first mold, of the opened tool. The first and/or second molds are electrically isolated from one another and from the associated manufacturing equipment. A vacuum draws the cover against the first mold and retains the cover in position during the manufacturing operation. The tool is moved to a closed position and the cover is positioned juxtaposed the substrate. The cover and substrate are positioned a distance apart thus creating a space therebetween. A vacuum is created in the space and a radio frequency (RF) electric field is applied between the first and second molds. The RF electric field causes a plasma to be created within the space. The plasma activates both the cover and the substrate. While the space is still under vacuum, a foaming material is injected into the space. The foaming material is drawn into the space by the vacuum and adheres to the activated cover and substrate. The RF electric field is subsequently coupled in the space to dielectrically cure the foam material.

17 Claims, 1 Drawing Sheet

METHOD FOR MANUFACTURING A FOAM PANEL

BACKGROUND OF THE INVENTION

1. Field of the Invention

Present invention relates to a method for producing a panel having a foam inner layer. More specifically, the present invention relates to a method of manufacturing an interior automotive panel having a decorative cover, rigid substrate and soft foam inner layer therebetween.

2. Description of the Related Art

It is known to manufacture foam composite panels by placing a rigid substrate and a flexible cover in a tool and then injecting a polyurethane foam precursor between the substrate and cover. An example of this construction is illustrated in U.S. Pat. No. 4,303,728, issued Dec. 1, 1981, and incorporated herein by reference. While this method has been in commercial production for many years, it requires the use of compatible materials for the foam, substrate and cover. The foam must adhere well to both the substrate and cover to produce an acceptable panel. Typical substrate materials are polycarbonate, and polyphenylene oxide. Typical cover or skin materials are polyvinyl chloride (PVC) and thermoplastic polyurethanes (TPU).

The foam fuses to both the cover and substrate through a combination of covalent bonding, hydrogen bonding, and Vander Wals interactions.

It is desirable to manufacture foam panels from materials which would otherwise be incompatible with a typical polyurethane foam. For example, it is desirable to use a polyolefin material such as polypropylene and polyethylene as the rigid substrate and/or a thermoplastic polyolefin (TPO) as the cover material. Unfortunately, typical polyurethane foams do not adhere well to these substrates and cover materials. It is desirable to provide a method which utilizes these lower-cost materials in the production of foam panels.

It is also known to improve the adhesion between polyurethane foam and highly elastic vulcanizable polymers or copolymers of olefinically unsaturated monomers in vulcanized form. These materials are typically useful in the manufacture of rubber soles for shoes. Examples of this method are described in U.S. Pat. No. 4,820,580 ('580). The vulcanizable polymer is treated in a conventional plasma reactor. After the plasma treatment, a polyurethane foam is applied atop the treated surface. The '580 patent does not describe the application method claimed herein. The samples were placed within a plasma reactor and exposed to a plasma gas. After the plasma exposure, the materials were removed from the reactor and a polyurethane foam applied atop the activated vulcanizable material. The '580 teaches a two-step batch process of first exposing the material in a reactor vessel and then removing the material from the reactor and depositing the foam atop the activated material.

It is a desired feature of the present invention to combine the plasma treatment and foaming operations into one continuous process thereby reducing cycle times for manufacturing the finished article and lowering the equipment cost required to produce the foam panel. It is a further object to the present invention to utilize the vacuum needed to create the plasma for the foaming operation. Finally, it is another object of the present invention to adhere dissimilar materials by activating sites on their surfaces and bonding a foam to these activated sites. Another object of the present invention is to utilize the RF field necessary to ignite and sustain the plasma in the foam cavity to subsequently dielectrically cure the polyurethane foam.

SUMMARY OF THE INVENTION

The present invention describes a method of manufacturing a panel having a polyurethane foam interlayer. A flexible cover is placed adjacent a first mold in an open tool. A rigid substrate is placed adjacent a second mold of the opened tool or atop the flexible cover in the first mold. Either the first or second mold, or both mold halves are electrically isolated from the other and from the associated manufacturing equipment. A vacuum draws the cover against the first mold and retains the cover in position during the manufacturing operation. The tool is moved to a closed position and the cover is positioned juxtaposed the substrate. The cover and substrate are positioned a distance apart thus creating a space therebetween. A vacuum of approximately 0.5 to 1 torr is created in the space. Alternatively, the vacuum could be created within the entire volume bounded by the inside tool surfaces and a radio frequency (RF) electric field is applied between the first and second molds. The RF electric field causes a plasma to be created within the space. The plasma activates both the cover and the substrate surfaces not in intimate contact with the tool surfaces. While the space is still under vacuum, a foaming material is injected into the space. The foaming material is drawn into the space by the vacuum and adheres to the activated cover and substrate. The vacuum, by definition, represents the removal of a significant portion of the atmospheric air previously present in the space created by the combination of the two tool halves. The absence of this air allows for a significantly improved foam filling process, eliminating voids caused by trapped air.

The invention allows for a low cost and rapid method of activating both cover and substrate components and producing a foamed panel. The same equipment utilized for manufacturing the foamed panel may also be used to create a plasma in the relatively small space between the cover and substrate. By utilizing the same equipment, the substrate and cover need not be transferred from a plasma reaction vessel to a molding device. Further, the vacuum used to create the plasma is useful in drawing the expanding foam material into the space between the cover and substrate and eliminating defects caused by trapped air. The combination of these steps results in a low cost and rapid method of producing the foamed panels.

The present invention has other advantages over the prior art because it allows for the use of otherwise dissimilar materials for the substrate and cover. Activating sites on the surfaces of the cover and substrate enables the foam to adhere well to materials which would otherwise be incompatible with polyurethane foams. Specifically, the invention enables the use of lower cost polyolefinic materials for substrate and cover components.

DETAILED DESCRIPTION OF THE PREFERRED EMBODIMENTS

Figure 1:
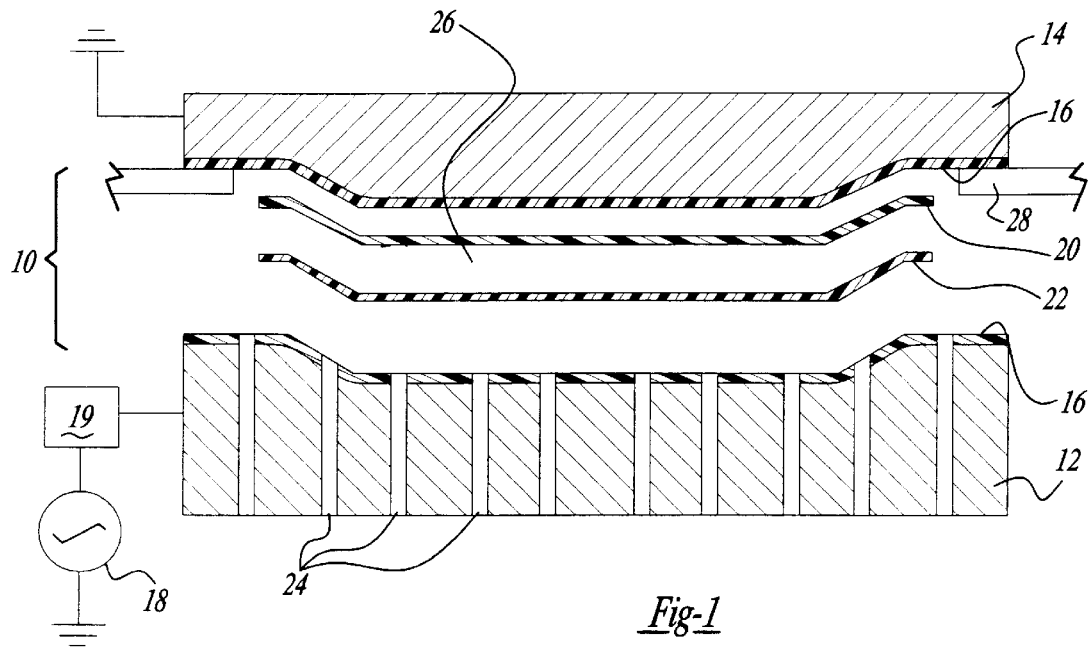
FIG. 1 is a cross-section of view of an apparatus useful in the present invention.
Figure 2:
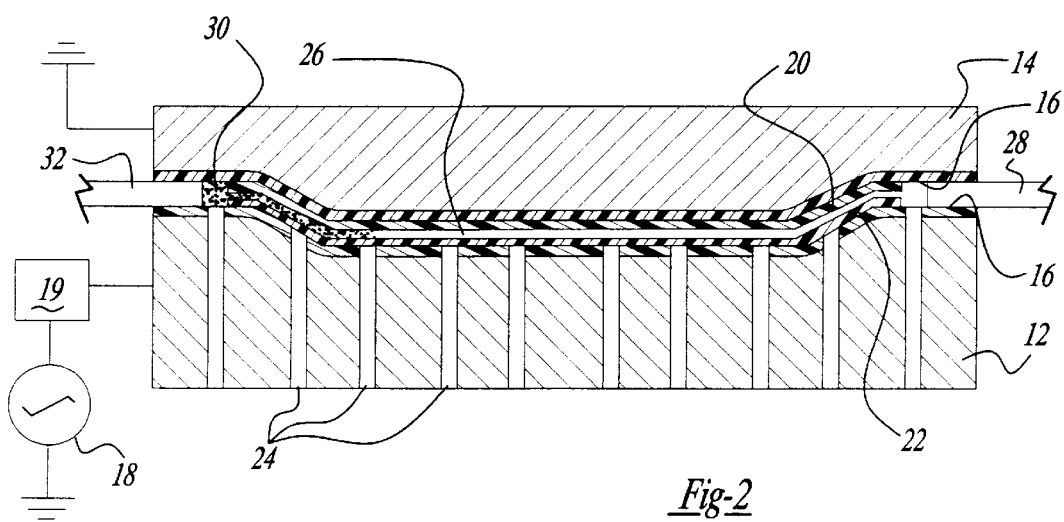
FIG. 2 is a cross-section of view of the apparatus illustrated in FIG. 1 undergoing foam injection.

The method of the present invention is illustrated in FIGS. 1 and 2. FIG. 1 illustrates a moveable tool 10 that is used in the present invention. The tool 10 is movable from an open position as illustrated in FIG. 1 to a closed position as will be illustrated in FIG. 2. The tool 10 comprises two or more electrically isolated molds 12,14. The manner of manufacturing electrically isolated molds for use with plasma treatment is illustrated in U.S. Pat. No. 5,227,180, and is incorporated herein by reference. A variety of methods may be used to insulate the molds 12 and 14 from one another and from the associated tooling equipment. Among the preferred means are ceramic, plastic, or rubber spacers placed between molds 12,14. FIG. 1 illustrates the molds 12, 14 being made from cast aluminum. The molds 12, 14 are electrically isolated through an epoxy facing 16. The epoxy facing 16 is bonded to the molds 12, 14 and has a typical thickness of between one-half inch and one inch, and does not conduct electricity. The epoxy facing 16 is also not typically susceptible to significant dielectric heating when exposed to an RF electric field.

The molds 12,14 are attached to RF generator 18 and impedance matching network 19. The RF generator 18 produces an RF electric field of between 100 and 6000 watts at a frequency between 450 Khz and 27.9 MHz. The RF electric field is coupled between mold halves 12 and 14 by impedance matching network 19 to produce a low pressure plasma in the space between the mold 12,14.

A flexible cover 22 is placed in mold cavity 12, against facing 16. The flexible cover 22 may be made from PVC, TPU, TPO, polypropylene or polyethylene. The cover 22 is premolded to conform with the shape of the mold 12. The cover 22 may optionally be held within the mold 12 through the use of a vacuum. Vents 24 in mold 12 provide a vacuum to secure the cover 22 against the mold cavity 12.

A rigid substrate 20 is selected from a low cost plastic material useful for making automotive instrument panels. Especially preferred, are panels made from polyolefinic materials including polypropylene, polyethylene, and TPO. The substrate 20 may be held in position on core mold 14 mechanically, by gravity or optionally through the use of a vacuum. The rigid substrate 20 may also be placed in mold cavity 12 atop flexible cover 22 as allowed by the design of substrate 20. After the substrate 20 and the cover 22 are placed within the molds 14, 12, the tool 10 is moved to a closed position as illustrated in FIG. 2.

When the tool 10 is closed, the cover 22 is positioned juxtaposed the substrate 20 and spaced a fixed distance apart from one another. The distance between the cover 22 and the substrate 20 defines a space 26. The space 26 will be filled with foam. When used to manufacture automotive interior components such as instrument panels, consoles or door trims, the space 26 has a thickness ranging from approximately three-eighths of an inch to one inch.

The molds 12,14 are sealed about their perimeter in a manner sufficient to maintain a vacuum less than one torr. A vent 28 evacuates the air within the space 26 to a pressure of between two torr and one-tenth of a torr. A plasma may be produced with the gases normally present in air or alternatively, quantities of different gases may be added to the space 26 to produce the desired plasma. The formation of a plasma within a relatively small space of a mold tool is described in U.S. Pat. No. 5,236,636 and is incorporated herein by reference. The remaining gases within the space 26 are exposed to an RF electric field created by the RF generator 18. The electric field produced by the RF generator 18 is between 450 Khz and 27.9 MHz and between 100 and 6000 watts. The strength and duration of the electrical field required varies with the volume of space 26 and with the extent of plasma treatment needed for the cover 22 and the substrate 20. When treating substrates and flexible covers made from polyolefinic materials and a space having an average cross-sectional thickness of three-quarters of an inch, an electric field of approximate power 1200 watts at a frequency of 13.5 Mhz, 15 seconds was found to provide a suitable plasma treatment.

The RF electric field excites the gases within the space 26 and causes dielectric breakdown of the gases, forming a plasma. The active species in the plasma react with the surface of the cover 22 and the substrate 20. Active molecular and atomic species from the gas are transferred to the surface of the cover 22 and the substrate 20. When using air, these molecules are typically oxygen, carbon dioxide, water and analogues thereof. The species transferred to the surface of cover 22 and substrate 20 are highly polar and provide chemically activated sites that are receptive to chemically bonding with the foam material. A typical chemical bond between an air plasma treated polyolefin and a polyurethane foam is that formed by the reaction of a carboxylic acid group on the surface of the plasma treated polyolefin and an isocyanate group associated with the polyurethane matrix of the foam.

After the cover 22 and the substrate 20 have been completely activated by the plasma and while the space 26 is still under a vacuum, a quantity of foam material 30 is injected into the space 26 through a nozzle 32. The foam 30 is drawn into the space 26 by the vacuum. Because the space 26 is under a vacuum, the foam flows much more quickly into the space 26. Additionally, relief vents for escaping gasses which are typically needed when injecting foam within a confined space, are not necessary. Because the present invention eliminates the need for venting the air within the space 26, the foam 30 does not have the opportunity to move outside of the part periphery through the vents, and accumulate on mold surfaces 16. Accumulation of foam on the mold surfaces 16 must be constantly removed to prevent substrate 20 or cover 22 from distorting when tool 10 is in the closed position. This process will result in a defective part. Additionally, if foam leaks onto mold surfaces 16 near the vents, these vents may become blocked, thus disrupting or preventing complete foam flow into space 26. This process will also result in a defective part. As an additional advantage, the RF field can be again coupled into the space 26, to facilitate the curing of the polyurethane foam through the process of dielectric energy absorption.

After the foam 30 cures sufficiently to retain its shape, the tool 10 is opened and the finished panel is removed from the tool 10. Typical cycle times for curing the foam can vary from 15 to 100 seconds depending on foam type and curing methodology. The present invention enables the production of foam panels made from materials which heretofore were thought to be unsuitable because they do not bond well with polyurethane foams. These materials include low-cost and/ or light-weight polyolefins for the substrate and flexible cover. Because the space 26 is under a vacuum when the foam 30 is injected, the foam is pulled into the space in addition to being pushed into the space through nozzle 32. This enables the design and manufacture of reduced foam cross-sections in the component because of the reduced back pressure experienced by the foam as it flows to fill space 26. This process will also reduce voids in the foam caused by the convergence of multiple foam flow fronts trapping latent air that could not be vented from space 26.

To further increase the adhesion between the cover 22 and the substrate 20, a polymerizable gas may be introduced within the space 26 prior to the application of the RF field. The process and materials to introduce a polymerizable gas are taught in commonly assigned U.S. Pat. No. 5,560,963 and are incorporated herein by reference.

In yet another alternative embodiment of the present invention, the RF field may optionally be used to also cure the foam within the space 26. After the foam 30 is injected into the space 26, the RF generator 18 produces an RF electric field between molds 12, 14. The RF electric field dielectrically heats the uncured foam 30. Prior to curing, the foam 30 is susceptible to RF dielectric heating. The dielectric heating causes the foam 30 to heat and accelerates curing.

The present invention, therefore, is well adapted to fulfill the objects, features and advantages outlined above as well as others that are inherent therein. While the invention has been illustrated by its preferred embodiments, other embodiments of the present invention are also possible and are intended to be covered within the spirit and scope of the attached claims.

We claim:

1. A method of manufacturing a panel having a foam interlayer comprising the steps of:

placing a flexible cover adjacent a first mold of an open tool;

placing a rigid substrate adjacent a second mold or atop the cover adjacent the first mold of said open tool;

electrically isolating said first mold from said second mold;

applying a vacuum to draw said cover against said first mold;

closing said tool and causing said cover to be positioned juxtaposed said substrate and creating a space therebetween;

drawing a vacuum in said space;

applying an RF electric field between said first and second molds and causing a plasma to be created within said space, said plasma activating said cover and substrate; and while said space is still under vacuum, injecting a foaming material into said space, said foaming material is drawn into said space by said vacuum and adheres to said activated cover and substrate.

2. The method of claim 1, after applying said RF field, the further step of withdrawing said RF field.

3. The method of claim 1, wherein said cover is a polyolefinic, polyvinyl, thermoplastic polyurethane, or thermoplastic polyurea material.

4. The method of claim 1, wherein said substrate is polyolefinic, a polycarbonate, or polystyrenic.

5. The method of claim 1, wherein said foam is a polyurethane material.

6. The method of claim 1, wherein said vacuum drawing step creates a vacuum between 10 and 0.1 torr.

7. The method of claim 1, wherein said RF field is between 100 and 6000 watts.

8. The method of claim 1, wherein said foam has a thickness between $\frac{3}{8}$ inches and one inch.

9. The method of claim 1, wherein said RF field is applied between 1 and 30 seconds.

10. The method of claim 1, further comprising the step of introducing an ionizable gas within said space before applying said RF field.

11. The method of claim 10, wherein said ionizable gas is air, $O_2/N_2$, $CO_2$, $NH_3$, $CO$, $SO_3$, $Ar/O_2$, and combinations thereof.

12. The method of claim 1, further comprising applying said RF electric field between said first and second molds and causing said foaming material to dielectrically heat and cure.

13. The method of claim 12, wherein said foam is a polyurethane material.

14. A method of manufacturing a panel having a foam interlayer comprising the steps of:

placing a flexible cover adjacent a first mold of an open tool;

placing a rigid substrate adjacent a second mold or alternately atop the flexible cover adjacent the first mold, of said open tool;

electrically isolating said first mold from said second mold;

applying a vacuum to draw said cover against said first mold;

closing said tool and causing said cover to be positioned juxtaposed said substrate and creating a space therebetween;

drawing a vacuum between 10 torr and 0.1 torr in said space;

applying an RF electric field between said first and second molds and causing a plasma to be created within said space, said plasma activating said cover and substrate;

withdrawing said RF field, and while said space is still under vacuum, injecting a foaming material into said space, said foaming material is drawn into said space by said vacuum and adheres to said activated cover and substrate.

15. The method of claim 14, wherein said substrate is polyolefinic, a polycarbonate, or polystyrenic.

16. The method of claim 14, wherein said cover material is a polyolefinic, polyvinyl, or thermoplastic polyurethane or thermoplastic polyurea material.

17. The method of claim 14, wherein said foam is a polyurethane material.

* * * * *